(12) United States Patent
Sun et al.

(10) Patent No.: US 10,830,669 B2
(45) Date of Patent: Nov. 10, 2020

(54) PERCEPTION SIMULATION FOR IMPROVED AUTONOMOUS VEHICLE CONTROL

(71) Applicant: TuSimple, Inc., San Diego, CA (US)

(72) Inventors: Xing Sun, San Diego, CA (US); Wutu Lin, San Diego, CA (US); Yufei Zhao, San Diego, CA (US); Liu Liu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

(21) Appl. No.: 16/660,244

(22) Filed: Oct. 22, 2019

(65) Prior Publication Data

US 2020/0049592 A1 Feb. 13, 2020

Related U.S. Application Data

(62) Division of application No. 15/598,693, filed on May 18, 2017, now Pat. No. 10,481,044.

(51) Int. Cl.
*G05D 1/00* (2006.01)
*G01M 17/00* (2006.01)
*B60W 30/00* (2006.01)

(52) U.S. Cl.
CPC ............ *G01M 17/00* (2013.01); *B60W 30/00* (2013.01)

(58) Field of Classification Search
None
See application file for complete search history.

(56) References Cited

U.S. PATENT DOCUMENTS

| 6,777,904 B1 | 8/2004 | Degner |
| 7,103,460 B1 | 9/2006 | Breed |
| 7,689,559 B2 | 3/2010 | Canright |

(Continued)

FOREIGN PATENT DOCUMENTS

| EP | 1754179 A1 | 2/2007 |
| EP | 2448251 A2 | 5/2012 |

(Continued)

OTHER PUBLICATIONS

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.

(Continued)

*Primary Examiner* — Jonathan M Dager
(74) *Attorney, Agent, or Firm* — Paul Liu; Jim Salter

(57) ABSTRACT

A system and method for real world autonomous vehicle perception simulation are disclosed. A particular embodiment includes: receiving perception data from a plurality of sensors of an autonomous vehicle; configuring the perception simulation operation based on a comparison of the perception data against ground truth data; generating simulated perception data by simulating errors related to the physical constraints of one or more of the plurality of sensors, and by simulating noise in data provided by a sensor processing module corresponding to one or more of the plurality of sensors; and providing the simulated perception data to a motion planning system for the autonomous vehicle.

20 Claims, 4 Drawing Sheets

(56) References Cited

U.S. PATENT DOCUMENTS

| | | |
|---|---|---|
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,655,537 B2 * | 2/2014 | Ferguson ............ B60W 30/095 701/23 |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,098,753 B1 * | 8/2015 | Zhu .................... G06K 9/00805 |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman |
| 9,317,776 B1 * | 4/2016 | Honda .................... G06T 5/008 |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2015/0062304 A1 | 3/2015 | Stein |
| 2015/0353082 A1 * | 12/2015 | Lee ........................ B60W 30/10 701/41 |
| 2016/0037064 A1 | 2/2016 | Stein |
| 2016/0094774 A1 | 3/2016 | Li |
| 2016/0129907 A1 * | 5/2016 | Kim ........................ B60W 30/09 701/26 |
| 2016/0165157 A1 | 6/2016 | Stein |
| 2016/0210528 A1 | 7/2016 | Duan |
| 2016/0321381 A1 * | 11/2016 | English ..................... G05B 17/02 |
| 2016/0375907 A1 * | 12/2016 | Erban ..................... B60W 10/08 701/99 |
| 2017/0022015 A1 * | 1/2017 | Gollu ......................... B65G 43/00 |
| 2017/0076019 A1 * | 3/2017 | Nallapa ..................... G09B 9/04 |
| 2017/0109928 A1 * | 4/2017 | Micks ...................... G09B 9/042 |
| 2017/0113799 A1 * | 4/2017 | Kovac ...................... G05D 1/104 |
| 2017/0132334 A1 * | 5/2017 | Levinson ................ G06F 30/20 |
| 2018/0203445 A1 * | 7/2018 | Micks ...................... G06F 30/15 |
| 2018/0209801 A1 * | 7/2018 | Stentz ................ G01C 21/3415 |
| 2018/0257643 A1 * | 9/2018 | Kroop ..................... G05D 1/0231 |
| 2018/0267537 A1 * | 9/2018 | Kroop ..................... B60W 30/10 |
| 2018/0348000 A1 * | 12/2018 | Cai ......................... G08G 1/0129 |
| 2019/0025843 A1 * | 1/2019 | Wilkinson ........... G05D 1/0212 |
| 2019/0056484 A1 * | 2/2019 | Bradley .................. G01S 17/42 |
| 2019/0072965 A1 * | 3/2019 | Zhang ..................... G08G 1/167 |
| 2019/0072966 A1 * | 3/2019 | Zhang ..................... G08G 1/166 |
| 2019/0101927 A1 * | 4/2019 | Zhao ...................... G05D 1/0212 |
| 2019/0129436 A1 * | 5/2019 | Sun ....................... G05D 1/0088 |
| 2019/0163181 A1 * | 5/2019 | Liu ....................... G05D 1/0287 |
| 2019/0163182 A1 * | 5/2019 | Li ......................... G09B 19/167 |
| 2019/0164007 A1 * | 5/2019 | Liu ....................... G08G 1/0112 |
| 2019/0186920 A1 * | 6/2019 | Leach ..................... G01S 17/86 |
| 2019/0367020 A1 * | 12/2019 | Yan ................... B60W 30/0956 |
| 2020/0174112 A1 * | 6/2020 | Xing ........................ G01S 7/41 |

FOREIGN PATENT DOCUMENTS

| | | | |
|---|---|---|---|
| EP | 2463843 | A2 | 6/2012 |
| EP | 2463843 | A3 | 7/2013 |
| EP | 2761249 | A1 | 8/2014 |
| EP | 2463843 | B1 | 7/2015 |
| EP | 2448251 | A3 | 10/2015 |
| EP | 2946336 | A2 | 11/2015 |
| EP | 2993654 | A1 | 3/2016 |
| EP | 3081419 | A1 | 10/2016 |
| WO | WO/2005/098739 | A1 | 10/2005 |
| WO | WO/2005/098751 | A1 | 10/2005 |
| WO | WO/2005/098782 | | 10/2005 |
| WO | WO/2010/109419 | A1 | 9/2010 |
| WO | WO/2013/04612 | | 4/2013 |
| WO | WO/2014/111814 | A2 | 7/2014 |
| WO | WO/2014/111814 | A3 | 7/2014 |
| WO | WO/2014/201324 | | 12/2014 |
| WO | WO/2015/083009 | | 6/2015 |
| WO | WO/2015/103159 | A1 | 7/2015 |
| WO | WO/2015/125022 | | 8/2015 |
| WO | WO/2015/186002 | A2 | 12/2015 |
| WO | WO/2015/186002 | A3 | 12/2015 |

(56) References Cited

FOREIGN PATENT DOCUMENTS

| WO | WO/2016/135736 | 9/2016 |
|----|----------------|--------|
| WO | WO/2017/013875 A1 | 1/2017 |

OTHER PUBLICATIONS

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.

Kendall, Alex, Gal, Yarin, "What Uncertainties Do We Need in Bayesian Deep Learning for Computer Vision", arXiv:1703.04977v1 [cs.CV] Mar. 15, 2017.

Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Jendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.

Adhiraj Somani, Nan Ye, David Hsu, and Wee Sun Lee, "DESPOT: Online POMDP Planning with Regularization", Department of Computer Science, National University of Singapore, date unknown.

Adam Paszke, Abhishek Chaurasia, Sangpil Kim, and Eugenio Culurciello. Enet: A deep neural network architecture for real-time semantic segmentation. CoRR, abs/1606.02147, 2016.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Veurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

* cited by examiner

PERCEPTION SIMULATION FOR IMPROVED AUTONOMOUS VEHICLE CONTROL

PRIORITY PATENT APPLICATION

This patent application is a divisional patent application drawing priority from U.S. non-provisional patent application Ser. No. 15/598,693; filed May 18, 2017. This present non-provisional patent application draws priority from the referenced patent application. The entire disclosure of the referenced patent application is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2019, TuSimple, All Rights Reserved.

TECHNICAL FIELD

This patent document pertains generally to tools (systems, apparatuses, methodologies, computer program products, etc.) for autonomous driving simulation systems, trajectory planning, vehicle control systems, and autonomous driving systems, and more particularly, but not by way of limitation, to a system and method for perception simulation for improved autonomous vehicle control.

BACKGROUND

An autonomous vehicle is often configured to follow a trajectory based on a computed driving path. The driving path is based in part on perception data received from sensors on the vehicle. The driving path is also based in part on predicted vehicle and traffic behaviors derived from a vehicle trajectory simulation. When conventional vehicle trajectory simulations are performed, the sensor data received from the vehicle is assumed to be accurate. However in the real world, this vehicle sensor data is often subject to errors, calibration inaccuracies, noise, or other problems. As a result, the vehicle trajectory simulation can produce trajectory data that is not consistent with the actual state of the autonomous vehicle. Therefore, the optimal behavior of the autonomous vehicle cannot be achieved.

SUMMARY

A system and method for perception simulation for improved autonomous vehicle control are disclosed herein. Perception data is needed to make a real world decision in an autonomous driving mode. However, perception data is typically not perfect. In a simulated environment established for the purpose of testing a motion planner's robustness, the simulation is expected to be similar, to the maximum extent, to the behavior of the vehicle in the real world. However, perception noise or other inaccuracies is a common imperfection occurring in the real world. In an example embodiment described herein, the perception noise is modeled in the simulation to improve the quality of the test or the simulated result. The perception noise model of an example embodiment is obtained by setting up calibration on the sensors, and by comparing testing perception result data with ground truths. The perception noise model is then applied to the simulation system for a more realistic perception.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

A system and method for perception simulation for improved autonomous vehicle control are disclosed herein. Perception data is needed to make a real world decision in an autonomous driving mode. However, perception data is typically not perfect. In a simulated environment established for the purpose of testing a motion planner's robustness, the simulation is expected to be similar, to the maximum extent, to the behavior of the vehicle in the real world. However, perception noise or other inaccuracies is a common imperfection occurring in the real world. In an example embodiment described herein, the perception noise is modeled in the simulation to improve the quality of the test or the simulated result. The perception noise model of an example embodiment is obtained by setting up calibration on the sensors, and by comparing testing perception result data with ground truths. The perception noise model is then applied to the simulation system for a more realistic perception.

Figure 1:
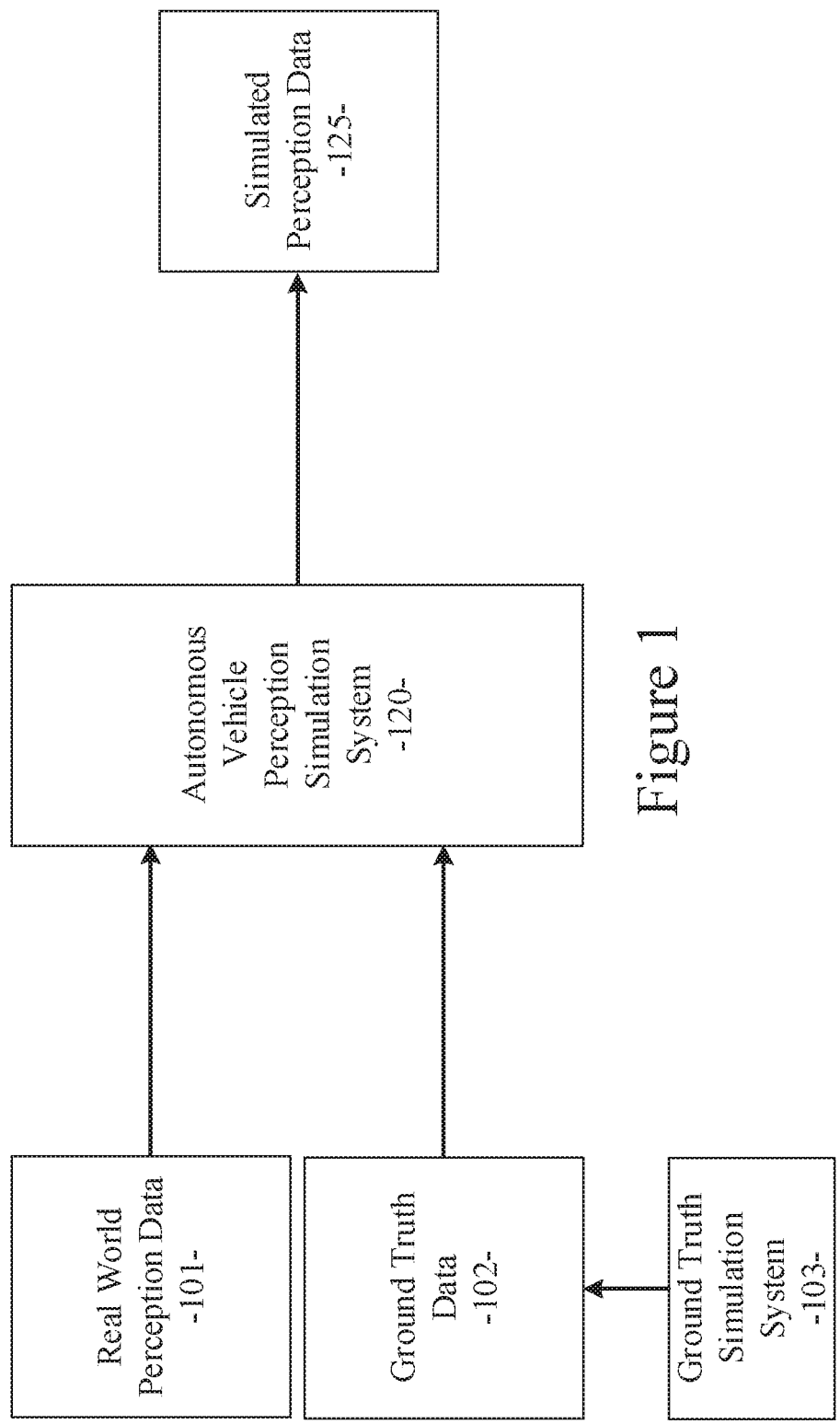
FIG. 1 illustrates a first phase for building an autonomous vehicle perception simulation system in an example embodiment.

As described in various example embodiments, a system and method for real world autonomous vehicle perception simulation are described herein. Referring to FIG. 1, an example embodiment disclosed herein can be implemented in two phases. In a first phase shown in FIG. 1, an autonomous vehicle perception simulation system 120 under calibration can receive real world perception data 101 from an array of perception sensors and output from perception data processing modules that are typically used in an autonomous vehicle or with an autonomous vehicle simulation system. The intent of the first phase is to analyze the output of calibration results from sensors and perception data processing modules to determine the extent of the errors or inaccuracies experienced with the typical array of perception sensors and perception data processing modules. As shown in the example embodiment of FIG. 1, the autonomous vehicle perception simulation system 120 under calibration can receive real world perception data 101 from a variety of perception sensor devices in the form of image data from image generating devices (e.g., cameras), distance data from light amplification by stimulated emission of radiation (laser) devices or light detection and ranging (LIDAR) devices, location data from global positioning system (GPS) devices, data from sound navigation and ranging (sonar) devices, data from radio detection and ranging (radar) devices, and the like. The perception data collected by the perception simulation system 120 reflects truly realistic, real-world perception data that would be transferred to an autonomous vehicle control system or vehicle simulation system in normal operations. The gathered perception data 101 can be received and processed by the autonomous vehicle perception simulation system 120 in a phase 1 calibration mode. The real world perception data 101 can be used by the autonomous vehicle perception simulation system 120 to build a perception simulation model that can simulate perception data errors as described in more detail below.

Referring still to FIG. 1, components of the autonomous vehicle perception simulation system 120 can perform filtering, object segmentation, object classification, and other image processing or data processing functions to isolate vehicle or object presence and activity in the images, sensor data, and other perception data 101 received by the autonomous vehicle perception simulation system 120. The autonomous vehicle perception simulation system 120 can also receive ground truth data 102. In one example embodiment, the ground truth data 102 can correspond to a data representation of the exact actual location and configuration of every object in a particular environment or every object in proximity to the autonomous vehicle. The ground truth data 102 can be generated by empirical measurement or highly sensitive and accurate sensing devices, such as Lidar data, GPS data, drone data, and the like. In another example embodiment, the ground truth data 102 can correspond to a data representation of a simulation of ground truth data produced by a data simulation system 103. In this embodiment, the exact locations and configurations of every object in a particular environment or every object in proximity to the autonomous vehicle can be precisely defined by the simulation system configured to simulate an environment in which an autonomous vehicle may operate. By use of the actual or simulated ground truth data 102 as a reference, the autonomous vehicle perception simulation system 120 can be executed as described in more detail below.

Real world perception sensor devices and sensor data processing modules can experience errors and other inaccuracies in normal operation. These errors and inaccuracies can be modeled or simulated by the autonomous vehicle perception simulation system 120 based on a comparison of the real world perception data 101 and the ground truth data 102 in the calibration phase. As described above, the ground truth data 102 can represent the exact locations and configurations or simulated locations and configurations of every object in a particular environment or every object in proximity to the autonomous vehicle. The perception simulation system 120 can receive the perception data 101 over a pre-determined time period and compare the received data with the corresponding ground truth data 102. The performance and accuracy of each of the perception sensor devices and sensor data processing modules over a pre-determined time period can be tracked and evaluated. In this manner, the errors and other inaccuracies for each of the perception sensor devices and sensor data processing modules can be detected. Based on this error detection, models can be generated to simulate the typical errors produced by each of the sensor devices and processing modules. These models can be generated by the autonomous vehicle perception simulation system 120. As a result, the autonomous vehicle perception simulation system 120 can produce simulated perception data 125 that corresponds to the modeled data produced for each of the perception sensor devices and sensor data processing modules over the pre-determined time period.

In an alternative embodiment, the autonomous vehicle perception simulation system 120 can be configured to generate models to simulate the typical errors produced by vehicle sensor devices and processing modules based only on the receipt of actual or simulated ground truth data 120 without the real world perception data 101. As described above, the real world perception data 101 can be received and processed by the autonomous vehicle perception simulation system 120 in a phase 1 calibration mode. Once calibrated with the real world perception data 101 in the phase 1 calibration mode, the autonomous vehicle perception simulation system 120 can subsequently generate sensor simulation models without the need to further receive the real world perception data 101. In this embodiment, the real-world perception data 101 is not used to generate the simulated perception data 125 directly. Instead, the real-world perception data 101 is used with actual or simulated ground truth data 102 to initially configure the autonomous vehicle perception simulation system 120. Then, the autonomous vehicle perception simulation system 120 can use actual or simulated ground truth data 102 to generate the simulated perception data 125.

The simulated perception data 125 is important for configuring or training a motion planning system for an autonomous vehicle or a vehicle simulation system. Because the simulated perception data 125 can model the errant or inaccurate data provided by typical sensor devices and processing modules, the simulated perception data 125 more closely corresponds to the errant real world data that would be provided from actual perception sensors or processing modules of an actual vehicle. Because the simulated perception data 125 more closely corresponds to the real world, the motion planning system or vehicle simulation configured or trained with the simulated perception data 125 will also more closely correspond to the real world. Thus, the simulated perception data 125 provided by the autonomous vehicle perception simulation system 120 can be used to produce a more effective control system for an autonomous vehicle. In other words, the simulated perception data 125 generated by the autonomous vehicle perception simulation system 120 is indirectly useful for configuring the control systems for an autonomous vehicle. It will be apparent to those of ordinary skill in the art that the autonomous vehicle perception simulation system 120 and the simulated perception data 125 as described and claimed herein can be implemented, configured, processed, and used in a variety of other applications and systems as well.

Figure 2:
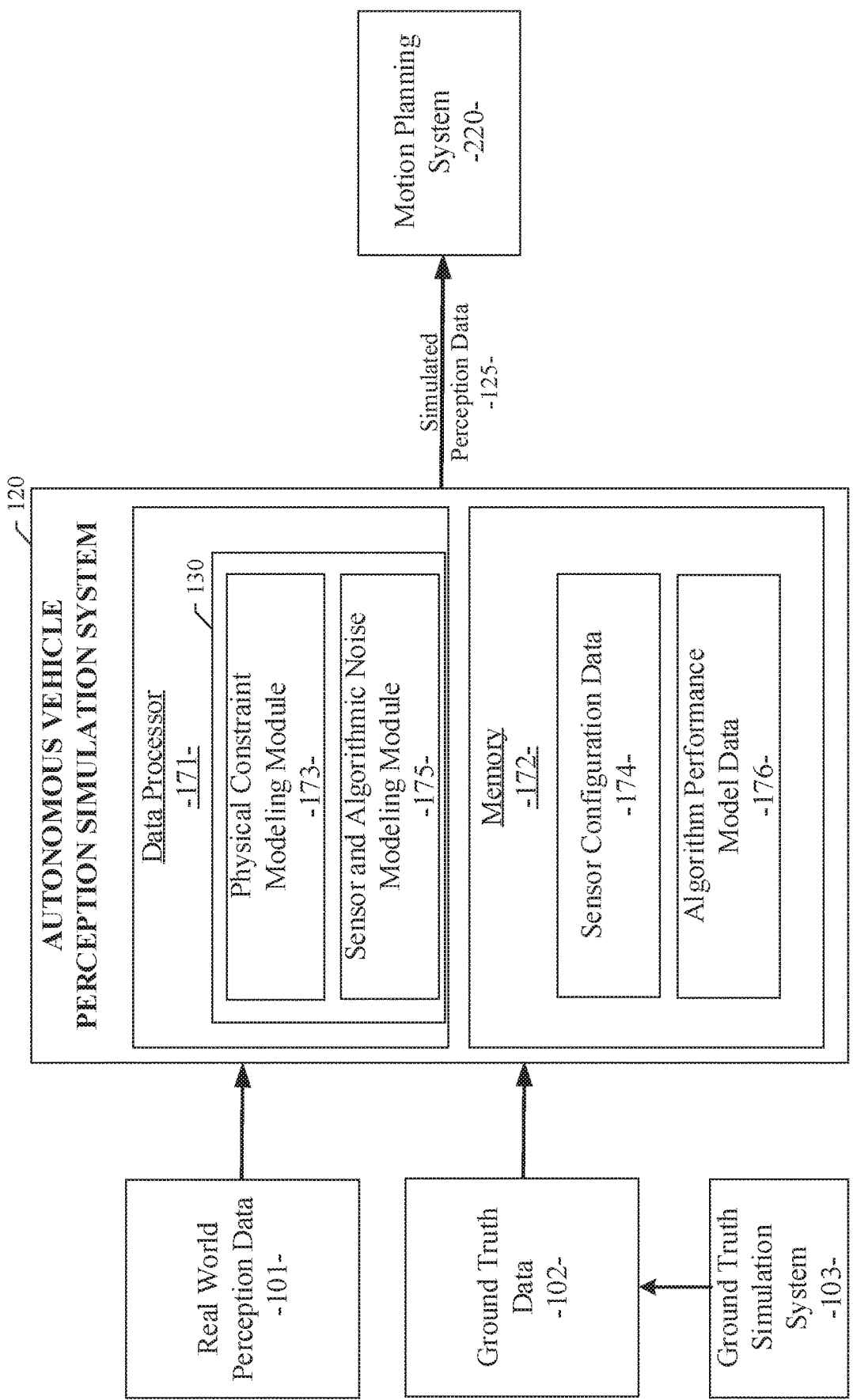
FIG. 2 illustrates the components of the autonomous vehicle perception simulation system of an example embodiment in a second phase.

Referring now to FIG. 2, a diagram illustrates the components of the autonomous vehicle perception simulation system 120 of an example embodiment. In the example embodiment, the autonomous vehicle perception simulation system 120 can be configured to include an autonomous vehicle perception simulation module 130 configured for execution by a data processor 171 in a computing environment of the autonomous vehicle perception simulation system 120. In the example embodiment, the autonomous vehicle perception simulation module 130 can be configured to include a physical constraint modeling module 173 and a sensor and algorithmic noise modeling module 175. The physical constraint modeling module 173 and the sensor and algorithmic noise modeling module 175 can be configured as software modules for execution by the data processor 171. As described in more detail below, the physical constraint modeling module 173 and the sensor and algorithmic noise modeling module 175 serve to model different types of errors or anomalies occurring in the real world perception data 101.

As shown in FIG. 2, a data storage device or memory 172 can also be provided in the autonomous vehicle perception simulation system 120 of an example embodiment. The memory 172 can be implemented with standard data storage devices (e.g., flash memory, DRAM, SIM cards, or the like) or as cloud storage in a networked server. In an example embodiment, the memory 172 can be used to store a set of sensor configuration data 174. The sensor configuration data 174 corresponds to a data representation of various types of configuration parameters or settings to configure the operation of the various perception sensors of an autonomous vehicle or a vehicle simulation. The memory 172 can also be used to store a set of algorithm performance model data 176. The algorithm performance model data 176 corresponds to a data representation of various types of configuration parameters or settings to configure the operation and performance of the various perception data processing modules used in an autonomous vehicle or a vehicle simulation.

As described above, the autonomous vehicle perception simulation system 120 can produce simulated perception data 125 that corresponds to the modeled data produced for each of the perception sensor devices and sensor data processing modules over the pre-determined time period. Alternatively, the autonomous vehicle perception simulation system 120 can produce simulated perception data 125 that corresponds to actual or simulated ground truth data 102 after calibration with real world perception data 101. In most cases, there are two types of errors or anomalies occurring in the real world perception data 101 that can be modeled by an example embodiment. A first type of error or anomaly corresponds to the physical constraints of the various types of perception sensors used with the autonomous vehicle. For example, some perception sensor devices have a physical range, beyond which the sensor device cannot detect objects or produce useful data. In some cases, the sensor configuration data 174 can be used to quantify these device physical constraints. However, the physical constraints of the sensor devices can vary based on a variety of factors including environmental conditions, vehicle speed, location, or state, the condition or capabilities of the sensor device, and the like. In addition, the context of the usage of the perception sensor is also a factor in the quality of the data produced by the sensor. For example, there may be obstructions or occlusions that may interfere with the ability of a sensor to view a particular location and therefore detect objects or produce useful data related to the particular location. As a result, there are a variety of physical constraint limitations that can occur in the real world perception data 101 that can degrade the quality of the data provided by the perception sensors.

In an example embodiment, the physical constraint modeling module 173 can be configured to model these perception device physical constraint limitations or anomalies. The modeling can be based in part on the initial configuration and calibration of each perception device performed during the phase 1 calibration described above and retained as sensor configuration data 174. The modeling of each perception device can also be based in part on the context in which the vehicle or vehicle simulation is operating. For example, the perception device modeling can be varied based on day operation versus night operation or heavy traffic conditions versus light traffic conditions. Heavy traffic conditions can produce a greater number of occlusion anomalies in comparison to light traffic conditions. Similarly, other contexts and conditions related to the perception device physical constraint limitations can be modeled by the physical constraint modeling module 173. The simulated physical constraint modeling for each perception device can be included in the simulated perception data 125 provided to a vehicle motion planning system 220, an autonomous vehicle control module configuration system, or vehicle simulation system.

In an example embodiment, a second type of error or anomaly occurring in the real world perception data 101 can be modeled by the sensor and algorithmic noise modeling module 175. In most vehicles that include a variety of perception sensor devices, various types of processing modules, algorithms, filters, detectors, and the like are used to pre-process the raw sensor data provided by the sensor devices. For example, image processing modules can be used to process the images received from a camera to detect objects, other vehicles, roadway lane stripes, etc. in the images. Other perception processing modules can include localization or navigation modules that use GPS or inertial data to determine a vehicle location and trajectory or path. Each of these perception data processing modules can be subject to noise, errors, inaccuracies, or other anomalies. The sensor and algorithmic noise modeling module 175 of an example embodiment can be configured to model these sensor data processing errors, noise, and anomalies. The modeling can be based in part on the initial configuration and model data provided for each perception data processing module as performed during the phase 1 calibration described above and retained as algorithm performance model data 176. The modeling of each perception data processing module can also be based in part on the context in which the vehicle or vehicle simulation is operating. The modeling of each perception data processing module can be configured to mimic the inaccuracy of actual sensors and perception devices and their corresponding perception data processing modules. For example, the sensor and algorithmic noise modeling module 175 of an example embodiment can be configured produce false positive or false negative object detections, which could be produced by a perception processing module performing image processing on input image data. Similarly, the sensor and algorithmic noise modeling module 175 can be configured produce noise or inaccuracies in the localization of the vehicle (i.e., the determination of the current location of the vehicle). The sensor and algorithmic noise modeling module 175 can be further configured produce noise or inaccuracies in the lane detection, which can be processed by an image processing module. The sensor and algorithmic noise modeling module 175 can be further configured produce noise or inaccuracies in the classification of detected objects or the estimated locations of detected objects, which can be processed by an image processing module. In a variety of other examples, the sensor and algorithmic noise modeling module 175 can be further configured produce noise or inaccuracies in any of the perception sensor processing modules used in an autonomous vehicle or vehicle simulation. Similarly, the physical constraint modeling module 173, as described above, can be configured produce errors, noise, or inaccuracies in any of the perception sensor devices used in an autonomous vehicle or vehicle simulation. The degree, extent, and timing of the errors or noise introduced into the modeling of the perception sensor devices or the perception sensor processing modules can be configurable based on a set of user-modifiable parameters. The simulated physical constraint modeling for each perception device and the simulated noise or inaccuracies in any of the perception sensor processing modules can be included in the simulated perception data 125 provided to a vehicle motion planning system 220, an autonomous vehicle control module configuration system, or vehicle simulation system.

As a result, the autonomous vehicle perception simulation system 120 can produce simulated perception data 125 that corresponds to the modeled data produced for each of the perception sensor devices and sensor data processing modules over the pre-determined time period. Alternatively, the autonomous vehicle perception simulation system 120 can produce simulated perception data 125 that corresponds to actual or simulated ground truth data 102 after calibration with real world perception data 101. The simulated perception data 125 can be used for configuring or training a motion planning system for an autonomous vehicle or a vehicle simulation system.

Figure 3:
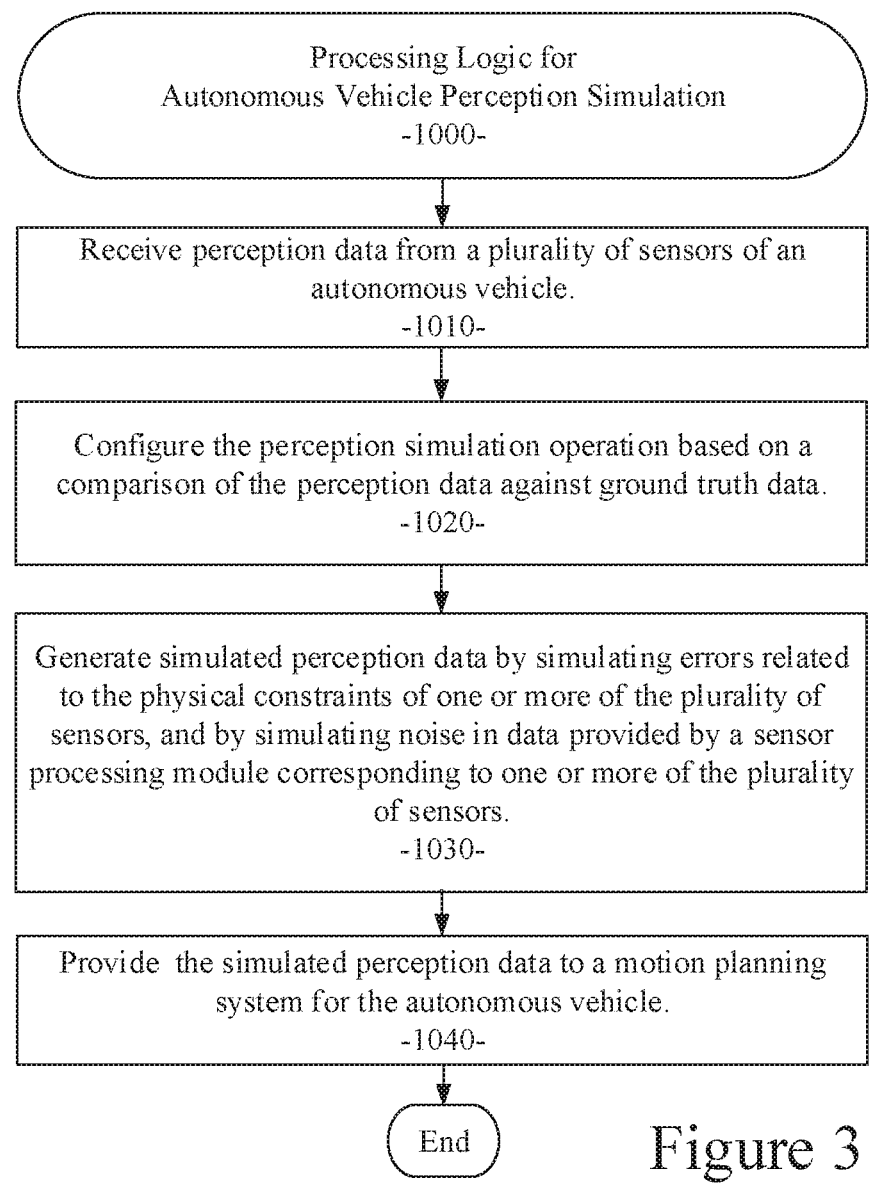
FIG. 3 is a process flow diagram illustrating an example embodiment of a system and method for perception simulation for improved autonomous vehicle control.

Referring now to FIG. 3, a flow diagram illustrates an example embodiment of a system and method 1000 for autonomous vehicle perception simulation. The example embodiment can be configured for: receiving perception data from a plurality of sensors of an autonomous vehicle (processing block 1010); configuring the perception simulation operation based on a comparison of the perception data against ground truth data (processing block 1020); generating simulated perception data by simulating errors related to the physical constraints of one or more of the plurality of sensors, and by simulating noise in data provided by a sensor processing module corresponding to one or more of the plurality of sensors (processing block 1030); and providing the simulated perception data to a motion planning system for the autonomous vehicle (processing block 1040).

Figure 4:
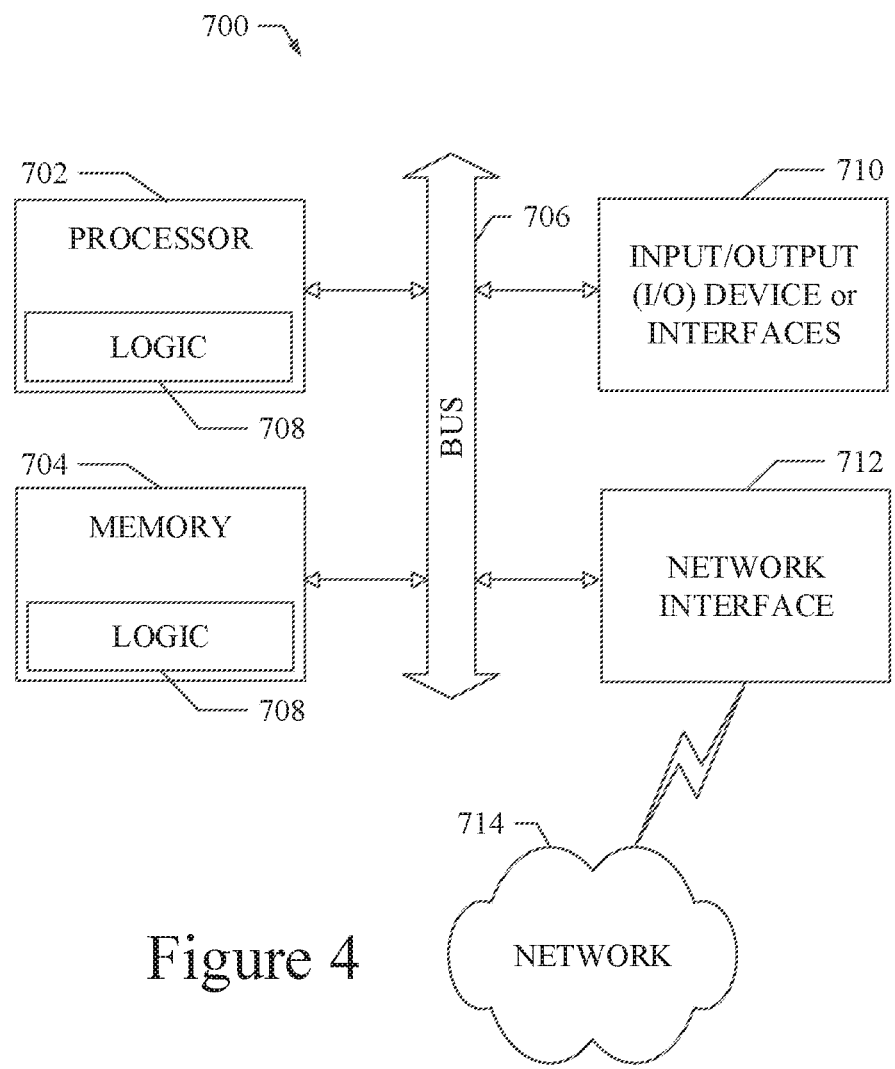
FIG. 4 shows a diagrammatic representation of machine in the example form of a computer system within which a set of instructions when executed may cause the machine to perform any one or more of the methodologies discussed herein.

FIG. 4 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
a perception simulation module, executable by the data processor, the perception simulation module being configured to perform a perception simulation operation for autonomous vehicles, the perception simulation operation being configured to:
receive perception data from a plurality of sensors of an autonomous vehicle;
configure the perception simulation operation based on a comparison of the perception data against ground truth data;
generate simulated perception data by simulating errors related to the physical constraints of one or more of the plurality of sensors, and by simulating noise in data provided by a sensor processing module corresponding to one or more of the plurality of sensors, wherein simulating errors related to the physical constraints of one or more of the plurality of sensors includes applying a maximum range beyond which the one or more of the plurality of sensors cannot detect objects; and
provide the simulated perception data to a motion planning system for the autonomous vehicle.

2. The system of claim 1 wherein simulating noise in data provided by a sensor processing module corresponding to one or more of the plurality of sensors includes simulating a false positive or false negative object detection.

3. The system of claim 1 wherein simulating noise in data provided by a sensor processing module corresponding to one or more of the plurality of sensors includes simulating noise in vehicle localization.

4. The system of claim 1 wherein simulating noise in data provided by a sensor processing module corresponding to one or more of the plurality of sensors includes simulating noise in lane detection.

5. The system of claim 1 wherein simulating noise in data provided by a sensor processing module corresponding to one or more of the plurality of sensors includes simulating errors in object type classification.

6. The system of claim 1 wherein simulating noise in data provided by a sensor processing module corresponding to one or more of the plurality of sensors includes simulating errors in object location.

7. The system of claim 1 wherein simulating noise in data provided by a sensor processing module corresponding to one or more of the plurality of sensors includes simulating errors in data produced by an image processing module.

8. A method comprising:
receiving perception data from a plurality of sensors of an autonomous vehicle;
configuring the perception simulation operation based on a comparison of the perception data against ground truth data;
generating simulated perception data by simulating errors related to the physical constraints of one or more of the plurality of sensors, and by simulating noise in data provided by a sensor processing module corresponding to one or more of the plurality of sensors, wherein simulating errors related to the physical constraints of one or more of the plurality of sensors includes applying a maximum range beyond which the one or more of the plurality of sensors cannot detect objects; and
providing the simulated perception data to a motion planning system for the autonomous vehicle.

9. The method of claim 8 wherein simulating noise in data provided by a sensor processing module corresponding to one or more of the plurality of sensors includes simulating a false positive or false negative object detection.

10. The method of claim 8 wherein simulating noise in data provided by a sensor processing module corresponding to one or more of the plurality of sensors includes simulating noise in vehicle localization.

11. The method of claim 8 wherein simulating noise in data provided by a sensor processing module corresponding to one or more of the plurality of sensors includes simulating noise in lane detection.

12. The method of claim 8 wherein simulating noise in data provided by a sensor processing module corresponding to one or more of the plurality of sensors includes simulating errors in object type classification.

13. The method of claim 8 wherein simulating noise in data provided by a sensor processing module corresponding to one or more of the plurality of sensors includes simulating errors in object location.

14. The method of claim 8 wherein simulating noise in data provided by a sensor processing module corresponding to one or more of the plurality of sensors includes simulating errors in data produced by an image processing module.

15. A non-transitory machine-useable storage medium embodying instructions which, when executed by a machine, cause the machine to:
receive perception data from a plurality of sensors of an autonomous vehicle;
configure the perception simulation operation based on a comparison of the perception data against ground truth data;
generate simulated perception data by simulating errors related to the physical constraints of one or more of the plurality of sensors, and by simulating noise in data provided by a sensor processing module corresponding to one or more of the plurality of sensors, wherein simulating errors related to the physical constraints of one or more of the plurality of sensors includes applying a maximum range beyond which the one or more of the plurality of sensors cannot detect objects; and
provide the simulated perception data to a motion planning system for the autonomous vehicle.

16. The non-transitory machine-useable storage medium of claim 15 wherein the ground truth data is produced by a ground truth data simulation system.

17. The non-transitory machine-useable storage medium of claim 15 wherein simulating noise in data provided by a sensor processing module corresponding to one or more of the plurality of sensors includes simulating a false positive or false negative object detection.

18. The non-transitory machine-useable storage medium of claim 15 wherein simulating noise in data provided by a sensor processing module corresponding to one or more of the plurality of sensors includes simulating noise in vehicle localization.

19. The non-transitory machine-useable storage medium of claim 15 wherein simulating noise in data provided by a sensor processing module corresponding to one or more of the plurality of sensors includes simulating noise in lane detection.

20. The non-transitory machine-useable storage medium of claim 15 wherein simulating noise in data provided by a sensor processing module corresponding to one or more of the plurality of sensors includes simulating errors in object type classification.

\* \* \* \* \*